United States Patent [19]

Yashiro et al.

[11] Patent Number: 5,252,372
[45] Date of Patent: Oct. 12, 1993

[54] OPTICAL INFORMATION RECORDING MEDIUM

[75] Inventors: Toru Yashiro, Yokosuka; Yutaka Ueda, Yokohama, both of Japan

[73] Assignee: Ricoh Company, Ltd., Tokyo, Japan

[21] Appl. No.: 694,442

[22] Filed: May 1, 1991

[30] Foreign Application Priority Data

May 1, 1990 [JP] Japan .................................. 2-11703

[51] Int. Cl.⁵ .............................................. B32B 9/00
[52] U.S. Cl. ........................................ 428/64; 428/65; 428/76; 428/457; 428/332; 428/913; 369/288; 346/135.1; 346/76 R; 430/945
[58] Field of Search ............ 369/288; 346/762, 135.1; 430/945; 428/64, 65, 76, 457, 332, 913

[56] References Cited

U.S. PATENT DOCUMENTS

| | | | |
|---|---|---|---|
| 4,237,468 | 12/1980 | Nahara et al. | 346/135.1 |
| 4,271,256 | 6/1981 | Kido et al. | 430/253 |
| 4,388,400 | 6/1983 | Tabei et al. | 430/346 |
| 4,415,650 | 11/1983 | Kido et al. | 430/273 |
| 4,821,050 | 4/1989 | Yabe et al. | 346/137 |
| 4,944,980 | 7/1990 | Akutsu et al. | 428/64 |
| 4,990,388 | 2/1991 | Hamada et al. | 428/64 |

Primary Examiner—Patrick J. Ryan
Assistant Examiner—Cathy K. Lee
Attorney, Agent, or Firm—Cooper & Dunham

[57] ABSTRACT

An optical information recording medium is composed of a substrate and a recording layer which is formed on the substrate and made of a composition comprising at least gold and sulfur, with the gold content being 50 atomic percent or more in the composition.

9 Claims, 1 Drawing Sheet

OPTICAL INFORMATION RECORDING MEDIUM

BACKGROUND OF THE INVENTION

1. Field of the Invention

The present invention relates to an optical information recording medium, and more particularly to a direct-read-after write (DRAW) type of an optical information recording medium comprising a substrate and a recording layer comprising a composition of at least gold and sulfur, with the content of the gold being 50 atomic percent or more in the composition.

2. Discussion of Background

In recent years, information recording media utilizing high density energy beams such as laser beams have been developed. These have been widely applied, in particular to compact disks (CD) used for audio reproduction such as music and the like. These conventional audio CDs are provided with pits which are preformed in the substrate, and exclusively used for audio reproduction. Because data recording and editing are not possible with this type of CD, the development of a direct-read-after-write (DRAW) type of CD is desired. More specifically, there is a demand for a DRAW-type CD having a high reflectance of 70% or more, which is capable of performing recording and reproduction operations at a low linear speed of 1.2 to 1.4 m/s.

Conventional optical information recording media have been developed mainly as memories for use with computers. For recording materials used in the recording layer of the conventional optical information recording media, metals with a low melting point such as tellurium and the like, and organic dyes are used in practice.

However, when these materials are used in the recording layers of DRAW-type CDs, the metals with a low melting point such as tellurium have the drawback that recording and reproduction at a low linear speed is very difficult because such low-melting-point metals provide recording layers with a high heat conductivity. In addition, a material with high reflectance which can record at a high sensitivity has not yet been developed. Also, because organic dyes have low heat conductivities they are suitable for recording and reproduction at low linear velocities, but a material with a reflectance of 70% or more containing an organic dye has not yet been discovered.

SUMMARY OF THE INVENTION

Accordingly, an object of the present invention is to provide, with due consideration to the drawbacks of such conventional recording materials, an optical information recording medium with high reflectance capable of performing recording and reproducing operations at a low linear speed as a DRAW-type CD.

The above object of the present invention can be achieved by an optical information recording medium comprising a substrate and a recording layer formed thereon which comprises a composition comprising at least gold and sulfur, with the gold content in the composition being 50 atomic percent or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
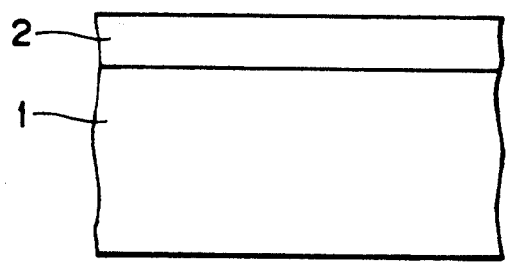
FIG. 1 and FIG. 2 are schematic cross-sectional views of examples of an optical information recording medium of the present invention.
Figure 2:
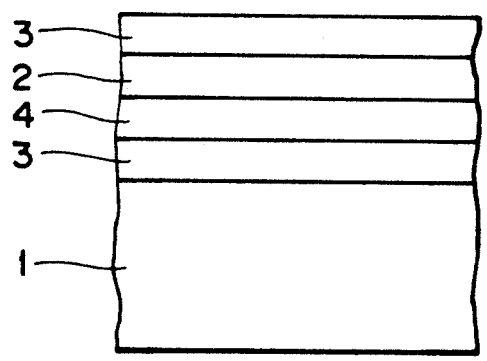

FIG. 1 and FIG. 2 illustrate typical structure of examples of an optical information recording medium of the present invention.

The simplest structure for the optical information recording medium of the present invention is illustrated in FIG. 1. In this optical information recording medium a recording layer 2 is formed on a substrate 1.

The optical information recording medium of FIG. 2 comprises an undercoat layer 4 between the substrate 1 and the recording layer 2, and a protective layer 3 between the substrate 1 and the undercoat layer 4, and another protective layer 3 on the recording layer 2.

To record information in the optical information recording medium, it is preferable to apply a light beam to the side of the substrate 1. In the case where the undercoat layer 4 is omitted and the substrate 1 demonstrates low light transmittance, the light beam may be applied to the side of the recording layer 2.

Transparent plastics and glass are suitable as materials for the substrate 1. Specific examples of the material for the substrate 1 for use in the present invention include polycarbonate resin, polyolefin resin, acrylic resin, epoxy resin, quartz glass and reinforced glass.

Guide grooves for tracking, guide pits, preformat for address signals may be formed in the surface of the substrate 1.

The recording layer 2 of the recording medium according to the present invention comprises a composition which comprises at least gold and sulfur, in which the gold content is 50 atomic percent or more. Recording can be carried out by applying a light beam to the recording medium to deform the irradiated portions of the recording layer 2.

Other elements which can be used as preferred components of the composition for the recording layer 2 are, for example, Sb, In, Sn, Ag, Cu and Al. Examples of the compositions including such elements include $Au_{80}Sb_{10}S_{10}$, $Au_{80}Sn_{10}S_{10}$, and $Au_{80}In_{10}S_{10}$, are preferred.

The gold content of the recording layer 2 is 50 atomic percent or more, preferably 80 atomic percent or more, since the reflectance of the recording layer decreases as the gold content decreases.

It is preferable that the sulfur content of the recording layer 2 be 20 atomic percent or less. As the sulfur content increases, the reflectance of the recording layer decreases.

The thickness of the recording layer 2 is preferably in the range of 50 to 3000 Å, and more preferably 1000 Å or less, because of easy deformation of the recording layer 2 during recording.

In forming the recording layer 2 it is expedient to use a vacuum deposition process by the resistance heating (single source vacuum-deposition or multi-source vacuum deposition), but the sputtering method and electron beam deposition method may also be used.

It is preferable that the undercoat layer 4 for use in the present invention comprise a thermoplastic organic compound and/or organic dye and have a light absorbance of 40% or less and a light transmittance of 60% or more at the wavelength of the light beams used for recording and reproduction. The portion of the undercoat layer 4 which is irradiated by the light beam for recording is deformed or decomposed, so that the recording layer 2 is easily changed for recording.

Examples of the material for the undercoat layer 4 include thermoplastic resins such as polyethylene resin, polystyrene resin, polyvinyl chloride resin, polyvinyl alcohol resin, acrylic resin, polycarbonate resin, polyamide resin, and cellulose-based plastics; organic dyes such as cyanine dye, phthalocyanine dye, naphthalocyanine dye, squarylium dye, naphtoquinone dye, metal indoaniline dye, and azulenium dye; and compounds and mixtures of these materials.

Particularly desirable materials for the undercoat layer 4 ar those which can be easily formed into films by application as a coating. Materials containing cyanine dye, represented by the following general formula, which can be changed or decomposed by light absorption at high sensitivity are acceptable:

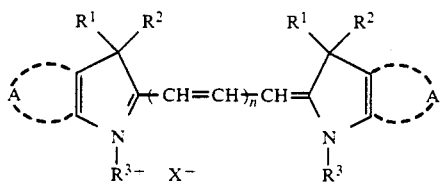

wherein $R^1$, $R^2$ and $R^3$ each independently represent an alkyl group having 1 to 6 carbon atoms; X represents a halogen, a perhalogeno acid, boron tetrafluoride, toluenesulfonic acid, or alkylsulfuric acid; A represents a benzene ring or a naphthyl ring, to which an alkyl group, an alkoxyl group, a hydroxyl group, a carboxyl group, a halogen, an allyl or an alkylcarboxyl group may be bonded as a substitutent; and n is an integer of 0 to 3.

It is preferable that the light absorbance of the undercoat layer 4 be 40% or less, more preferably 20% or less, and the light transmittance thereof be 60% or more, more preferably 70% or more, at the wavelength of the light beam used for recording and reproduction. When the light absorbance and the light transmittance fall within the above ranges, the light reflectance of the recording layer 2 does not decrease.

The thickness of the undercoat layer 4 can vary depending on the material used therein, but it is preferable that the thickness of the undercoat layer 4 be 1 μm or less, and more preferably, 1000 Å or less from the viewpoint of ease of deformation and decomposition thereof during recording.

The undercoat layer 4 can be formed by a solution coating method such as spinner coating, spray coating and dip coating. The vacuum deposition method can also be used.

The protective layer 3 is formed to (i) protect the recording layer 2 from damage, dust and soiling, and (ii) to improve the storage stability of the recording layer 2.

Examples of the material for the protective layer 3 include polymeric materials such as acrylic resin and epoxy resin; and inorganic compounds such as $SiO_2$, ZnS, TiN, $Al_2O_3$ and SiN.

The thickness of the protective layer 3 can vary depending on the type of material used therein, but about 0.1 to 100 μm is preferable.

The protective layer 3 can be formed by the conventional methods. For instance, when an inorganic material is used to form the protective layer 3, the vacuum deposition method and the sputtering method can be used; and when an organic material is used, solution coating methods such as spinner coating, spray coating and dip coating can be used.

In the optical information recording medium of the present invention, information is recorded by applying a recording light beam to the recording layer of the optical information recording medium to cause distortions in the light-exposed portion in the recording layer. Reproduction of the information recorded information is implemented by applying a reproduction light beam containing less energy than the recording light beam, specifically, a light beam which does not cause a change in the recording layer, but is capable of detecting the changes in the optical characteristics which correspond to the distortions in the recording layer.

In the present invention, the recording layer comprises a composition of at least gold and sulfur, with the gold content being 50 atomic percent or more, preferably 80 atomic percent or greater of Au, and 20 atomic percent or less of S. By this composition, it is possible to record and reproduce information in and from the recording medium of the present invention at a low linear speed required in a DRAW-type CD, and an optical information recording medium with high reflectance can be obtained.

Furthermore, by formation of an undercoat layer from a thermoplastic organic compound and/or an organic dye, in particular, a cyanine dye, with a light absorbance of 40% or less and a light transmittance of 60% or greater, in contact with the recording layer 2, the recording sensitivity can be improved without reducing the high reflectance of the recording layer.

Other features of this invention will become apparent in the course of the following description of exemplary embodiments, which are given for illustration of the invention and are not intended to be limiting thereof.

EXAMPLE 1

A disk-shaped polycarbonate substrate with a diameter of 130 mm and a thickness of 1.2 mm, provided with spiral guide grooves on the surface thereof was prepared by injection molding.

A commercially available polyvinyl butyral resin (Trademark "BL-2" made by Sekisui Chemical Co., Ltd.), and an organic dye represented by the following formula were dissolved in a mixed solvent of methanol and 1,2-dichloroethane, to prepare a coating liquid for an undercoat layer:

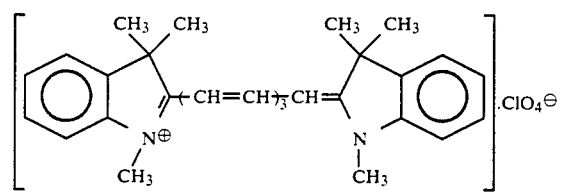

The thus prepared coating liquid was spin-coated on the polycarbonate substrate and dried so that that an undercoat layer with a light transmittance of 78% and a light absorbance of 8% at the wavelength of 780 nm was formed on the substrate.

A thin layer of $Au_{80}Sn_{10}S_{10}$ with a thickness of about 500 Å was vacuum-deposited on the above-prepared undercoat layer by Au-SnS binary vacuum-deposition using two deposition sources for Au and SnS in a vacuum-deposition apparatus employing the resistance heating method. Thus, an optical information recording medium No. 1 according to the present invention was obtained.

EXAMPLES 2 TO 5

The procedure for preparation of the optical information recording medium No. 1 in Example 1 was repeated except that the coated amount of the coating liquid for the undercoat layer used in Example 1 was separately changed so as to obtain the light transmittance and light absorbance of the undercoat layer as shown in Table 1, and that the composition for the recording layer was changed as shown in Table 1 by using any of Au-SnS, Au-SbS or Au-InS binary vacuum-deposition, so that optical information recording media No. 2 to No. 5 according to the present invention were obtained.

EXAMPLE 6

The procedure for preparation of the optical information recording medium No. 1 in Example 1 was repeated except that the undercoat layer used in Example 1 was not provided and that the composition for the recording layer was changed as shown in Table 1 by using the Au-SnS binary vacuum-deposition, so that optical information recording medium No. 6 according to the present invention were obtained.

COMPARATIVE EXAMPLE 1

The undercoat layer was formed on the disk-shaped polycarbonate substrate in the same manner as in Example 1.

A thin film of Au with a thickness of about 300 Å was vacuum-deposited on the above-prepared undercoat layer by the same manner as in Example 1. Thus, a comparative optical information recording medium No. 1 was obtained.

COMPARATIVE EXAMPLES 2 TO 3

The procedure for preparation of the optical information recording medium used in Comparative Example 1 was repeated except that the coated amount of the coating liquid for the undercoat layer used in Comparative Example 1 was separately changed so as to obtain the light transmittance and light absorbance of the undercoat layer as shown in Table 1, so that comparative optical information recording media No. 2 and No. 3 were obtained.

The reflectance of the recording layer of each optical information recording medium was measured using a spectrophotometer. The results are given in Table 1.

Each of the above-prepared optical information recording media was incorporated in an optical disk tester, and recording and reproduction tests were carried out with a laser beam wavelength of 780 nm, using a lens with a numerical aperture of 0.5, a linear speed of 1.3 m/s, a laser power for recording of 6.5 mW, and a laser power for reproduction of 0.5 mW, at information signal frequency of 750 KHz. The amplitude of the output signal was measured by an oscilloscope. The results are given in Table 1.

Information was recorded in any of the optical information recording media of the present invention at a low linear speed (1.3 m/s), and a low laser power for recording (6.5 mW), and high reflectance was obtained.

TABLE 1

|  | Undercoat Layer | | Recording unit | Amplitude of Output Signal (Arbitrary (%)) | Reflectance |
| --- | --- | --- | --- | --- | --- |
|  | Transmittance (%) | Absorbance (%) |  |  |  |
| Ex. 1 | 78 | 8 | $Au_{80}Sn_{10}S_{10}$ | 20 | 60 |
| Ex. 2 | 69 | 19 | $Au_{80}Sn_{10}S_{10}$ | 180 | 58 |
| Ex. 3 | 69 | 19 | $Au_{85}Sb_6S_9$ | 130 | 74 |
| Ex. 4 | 55 | 35 | $Au_{80}Sn_{10}S_{10}$ | 30 | 44 |
| Ex. 5 | 55 | 35 | $Au_{80}In_{10}S_{10}$ | 40 | 44 |
| Ex. 6 | no undercoat layer | | $Au_{70}Sn_{15}S_{15}$ | 50 | 55 |
| Comp. Ex. 1 | 78 | 8 | Au | 0 (recording impossible) | 83 |
| Comp. Ex. 2 | 69 | 19 | Au | 0 (same as above) | 80 |
| Comp. Ex. 3 | 55 | 35 | Au | 0 (same as above) | 61 |

In addition, when the recording pits formed on the optical information recording medium of the present invention were observed by an optical micorscope, the recording layer at the recording pit section was seen to be deformed.

The present invention can provide an optical information recording medium with a high reflectance of 70% or more, which can record and reproduce at a low linear speed of 1.3 m/s and low recording power of 6.5 mW as a DRAW-type CD, and which is superior to conventional optical information recording media.

What is claimed is:

1. An optical information recording medium comprising a substrate and a recording layer formed thereon comprising a composition comprising at least gold and sulfur, with the content of said gold being at least 50 atomic percent and less than 100 atomic percent in said composition.

2. The optical information recording medium as claimed in claim 1, wherein said composition further comprises at least one element selected from the group consisting of Sb, In, Sn, Ag, Cu and Al.

3. The optical information recording medium as claimed in claim 1, further comprising an undercoat layer in contact with said recording layer, said undercoat layer comprising at least one component selected form the group consisting of a thermoplastic organic material and an organic dye, with a light absorbance of 40% or less, and a light transmittance of 60% or more.

4. The optical information recording medium as claimed in claim 3, wherein said organic dye is a cyanine dye having formula:

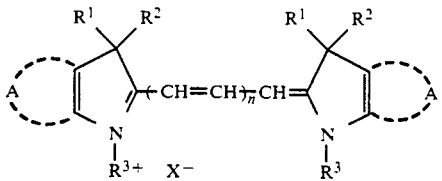

wherein $R^1$, $R^2$ and $R^3$ each independently represent an alkyl group having 1 to 6 carbon atoms; X represents a halogen, a perhalogeno acid, boron tetrafluoride, toluenesulfonic acid, or alkylsulfuric acid; A represents a benzene ring or a naphthyl ring, to which an alkyl group, an alkoxyl group, a hydroxyl group, a carboxyl group, a halogen, an allyl or an alkylcarboxyl group may be bonded as a substitutent; and n is an integer of 0 to 3.

5. The optical information recording medium as claimed in claim 1, further comprising a protective layer formed on said recording layer.

6. The optical information recording medium as claimed in claim 1, wherein said recording layer has a thickness in the range of 50 to 3000 Å.

7. The optical information recording medium as claimed in claim 3, wherein said undercoat layer has a thickness of not more than 1 μm and greater than zero.

8. The optical information recording medium as claimed in claim 5, wherein said protective layer has a thickness in the range of 0.1 to 100 μm.

9. The optical information recording medium as claimed in claim 5, wherein the content of said sulfur is not more than 20 atomic percent and greater than zero atomic percent in said composition.

* * * * *